(12) United States Patent
Meyer et al.

(10) Patent No.: US 8,311,329 B2
(45) Date of Patent: Nov. 13, 2012

(54) RELATIVE THRESHOLD AND USE OF EDGES IN OPTICAL CHARACTER RECOGNITION PROCESS

(75) Inventors: Hans Christian Meyer, Oslo (NO); Mats Stefan Carlin, Gjettum (NO); Knut Tharald Fosseide, Kolbotn (NO)

(73) Assignee: Lumex AS, Oslo (NO)

( * ) Notice: Subject to any disclaimer, the term of this patent is extended or adjusted under 35 U.S.C. 154(b) by 589 days.

(21) Appl. No.: 12/439,694

(22) PCT Filed: Sep. 5, 2007

(86) PCT No.: PCT/NO2007/000313
§ 371 (c)(1),
(2), (4) Date: Oct. 2, 2009

(87) PCT Pub. No.: WO2008/030104
PCT Pub. Date: Mar. 13, 2008

(65) Prior Publication Data
US 2011/0026813 A1  Feb. 3, 2011

(30) Foreign Application Priority Data
Sep. 7, 2006  (NO) .................................. 20064027

(51) Int. Cl.
*G06K 9/00* (2006.01)
(52) U.S. Cl. ........ 382/172; 382/271; 382/273; 382/266; 382/269; 385/455; 385/464; 385/465; 385/466
(58) Field of Classification Search .................. 382/266, 382/269, 273, 274, 270–271, 252, 190, 197, 382/205, 237, 171–173, 199, 159, 164, 168, 175–176, 224, 305, 141, 145, 149, 245; 385/455, 464–466, 3.04, 1.15, 3.13, 521–523, 296, 520, 528, 530; 348/187, 247
See application file for complete search history.

(56) References Cited

U.S. PATENT DOCUMENTS

| | | | |
|---|---|---|---|
| 5,781,658 A | 7/1998 | O'Gorman | |
| 5,889,885 A | 3/1999 | Moed et al. | |
| 6,061,476 A | 5/2000 | Nichani | |
| 6,577,762 B1 * | 6/2003 | Seeger et al. | 382/173 |
| 7,302,004 B2 * | 11/2007 | Zhang et al. | 375/240.16 |
| 2003/0031366 A1 | 2/2003 | Li et al. | |
| 2003/0142866 A1 | 7/2003 | Zuniga | |

(Continued)

FOREIGN PATENT DOCUMENTS

EP  0961218  1/1999
(Continued)

OTHER PUBLICATIONS

Mehmet Sezgin, Survey over image thresholding techniques and quantitative performance evaluation, Journal of Electronic Imaging, Jan. 2004, pp. 146-165, vol. 13(1).

(Continued)

*Primary Examiner* — Matthew Bella
*Assistant Examiner* — Mekonen Bekele
(74) *Attorney, Agent, or Firm* — Volpe and Koeing, P.C.

(57) ABSTRACT

Converting images to binary image representations is part of an Optical Character Recognition program in a computer system. The method and system is using a relative threshold level to convert the image to its binary image representation.

19 Claims, 9 Drawing Sheets

U.S. PATENT DOCUMENTS

2006/0098243 A1* 5/2006 Ahmed et al. ............... 358/474
2008/0187225 A1* 8/2008 Katsuyama ................. 382/190

FOREIGN PATENT DOCUMENTS

WO      03001450      1/2003

OTHER PUBLICATIONS

Lin, L. et al. Text extraction from name cards with complex design, Proceedings. Eighth Int'l Conference on Document Analysis and Recognition, 2005, IEEE Comput. Soc., Los Alamitos, CA, USA, vol. 2, pp. 977-980, ISBN O-7695-2420-6, XP 10878161.

Kasar, T. et al. Font and background color independent text binarization, Second Int'l Workshop on Camera-Based Document Analysis and Recognition (CBDAR2007), Sep. 22, 2007, [retrieved on Jan. 21, 2008].

\* cited by examiner

RELATIVE THRESHOLD AND USE OF EDGES IN OPTICAL CHARACTER RECOGNITION PROCESS

The present invention is related to a method and system providing a threshold for grey level in images when producing binary images of the images in an Optical Character Recognition process in a computer system, and especially to a method system comprising steps for identifying local estimates of background in documents, selecting sub-images assumed to comprise text (or foreground), finding grey-levels in estimated edges in the sub-images, extracting local thresholds from the grey levels of the edges, finding a local relative threshold and using the relative threshold in the whole image to distinguish background and foreground of the document, thereby providing a possibility to remove unfortunate effects of background/foreground noise in OCR processing of grey level or coloured images, according to the attached independent claims 1, 15 an 16, and embodiments as claimed in the corresponding dependent claims.

Images often have pixels belonging to objects that comprise substantially different grey levels with respect to the background of the image. In an image comprising text, there are ideally only two distinct levels, one black level for the letters and a white level for the paper, for example. However, the background may comprise different sections of coloured paper, other types of italicize that may differentiate sections of a page (grey levels, colour levels, for example), and irregularities due to aging, dirt, etc. that also may contribute to variations in background grey levels. The text characters may also be coloured, a document sheet may have underlined text lines, JPEG compression of image files may provide artefacts in an image etc., which all contributes difficulties in a process separating background and foreground in an OCR system implemented in a computer system. Digital photos of text may also have contrast variations due to inhomogeneous illumination. The ability to correctly distinguish between background and foreground is advantageous, since it improves the OCR process efficiency considerably, as known to a person skilled in the art. The article "Survey over image thresholding techniques and quantitative performance evaluation" by Mehmet Segzin et al, Journal of electronic Imaging, January 2004, Vol. 13 (1) describes the problem and different prior art solutions to the problem.

The principal prior art solution is to introduce a threshold as a means for covering a range of variable background levels, variable foreground levels etc. An image section is compared with a threshold where the outcome of the test will tell the system if the image section is background or not, and the corresponding binary image of the image can be assigned a proper value corresponding to background or foreground, as known to a person skilled in the art.

An example illustrating improvements of efficiency of an OCR function is to make the background uniform, for example completely white. The contrast between the edge of characters and the background may therefore improve dramatically, thereby improving the ability to produce a binary image for the OCR function that actually may identify a character correctly. Therefore, with a threshold, the background and foreground may be identified. However, as pointed out above, the concept of background and foreground is a complex issue since both the background and foreground may vary considerably, and may comprise different types of graphical elements.

U.S. Pat. No. 5,889,885 disclose a method and apparatus for separating foreground and background in an image containing text by providing a multiple set of binary images of the text, and then selecting the binary image representing the foreground or text in the best manner. The method uses multiple sets of threshold parameters in a contrast based histogram evaluation for producing the set of binary images to select the best image from. An image of a document to be processed is divided into rectangles and uses the dynamic range of pixel values inside the rectangle to determine the background level and foreground level in the rectangle. The contrast in the rectangle is then used to determine if one should look for the foreground in the rectangle. However, using local maximum and minimum values of pixels inside the rectangle makes this method susceptible to noise as known to a person skilled in the art. For example, binary images produced this way may provide rectangular black spots due to noise in the high pixel values, and a single noisy pixel can block out the rest of the text in the rectangle. Therefore, the method according to this publication provides a set of processing parameters that can be varied or iterated to produce a set of binary images to select from. However, in column 9 lines 60 to 67 of this publication, it is stated that it can be difficult to find the set of processing parameters that provides a binary image suitable for further OCR processing.

Therefore, there is a need for improving the threshold technique in OCR programs implemented in computer systems.

According to an aspect of the present invention, the contrast which can be expressed as the ratio between the background and foreground is usually constant in an image of a document page. The reason is that the actual reflectiveness of the black parts (the text itself, for example) and the white parts (the paper itself, for example) is constant. It is usually only the lightning that changes across a page, and hence provides variations in foreground and background levels in different parts of an image of a document.

According to another aspect of the present invention, a local relative threshold may be derived from an image that provides a means for identifying a local relative contrast between foreground and background which eliminates effects of variations in foreground and background in different restricted areas of the image. By utilizing this relative threshold, unfortunate effects of irregularities in background/foreground grey levels in OCR processing may be eliminated.

According to an example of embodiment of a method according to the present invention, the method comprises steps of estimating a local background level throughout sections of the document, and then estimating a foreground level in one or more regions that probably comprises text, and then using the local background level that has been estimated above, and the foreground level from the region of interest or the regions of interest to set a threshold level for the grey level in all regions of the document.

According to another example of embodiment of a method according to the present invention, the method comprises steps of estimating the background level by identifying pixel values with a highest level representing the colour white, denoted the whitest pixel path, throughout sections of the image of the document by first dividing the image into horizontal strips, for example, and then repeating for each horizontal stripe, identifying the whitest pixel located for example on the left side of the stripe, then generating a search area next to the whitest pixel identified above, wherein the search area is provided by a maximum displacement of rows up and down, but bounded by the size of the horizontal stripe, identifying a whitest pixel in the current search area, and repeat the process with a next search area starting next to the whitest pixel identified in the previous search area, and repeat this process until the whitest pixel has been identified in the right most column of the current stripe under investigation. The locations in the image of the document comprising each of the whitest pixels constitute the whitest pixel path in the image. Based on the whitest pixel path, the background level throughout all sections of an image can be established.

Figure 1:
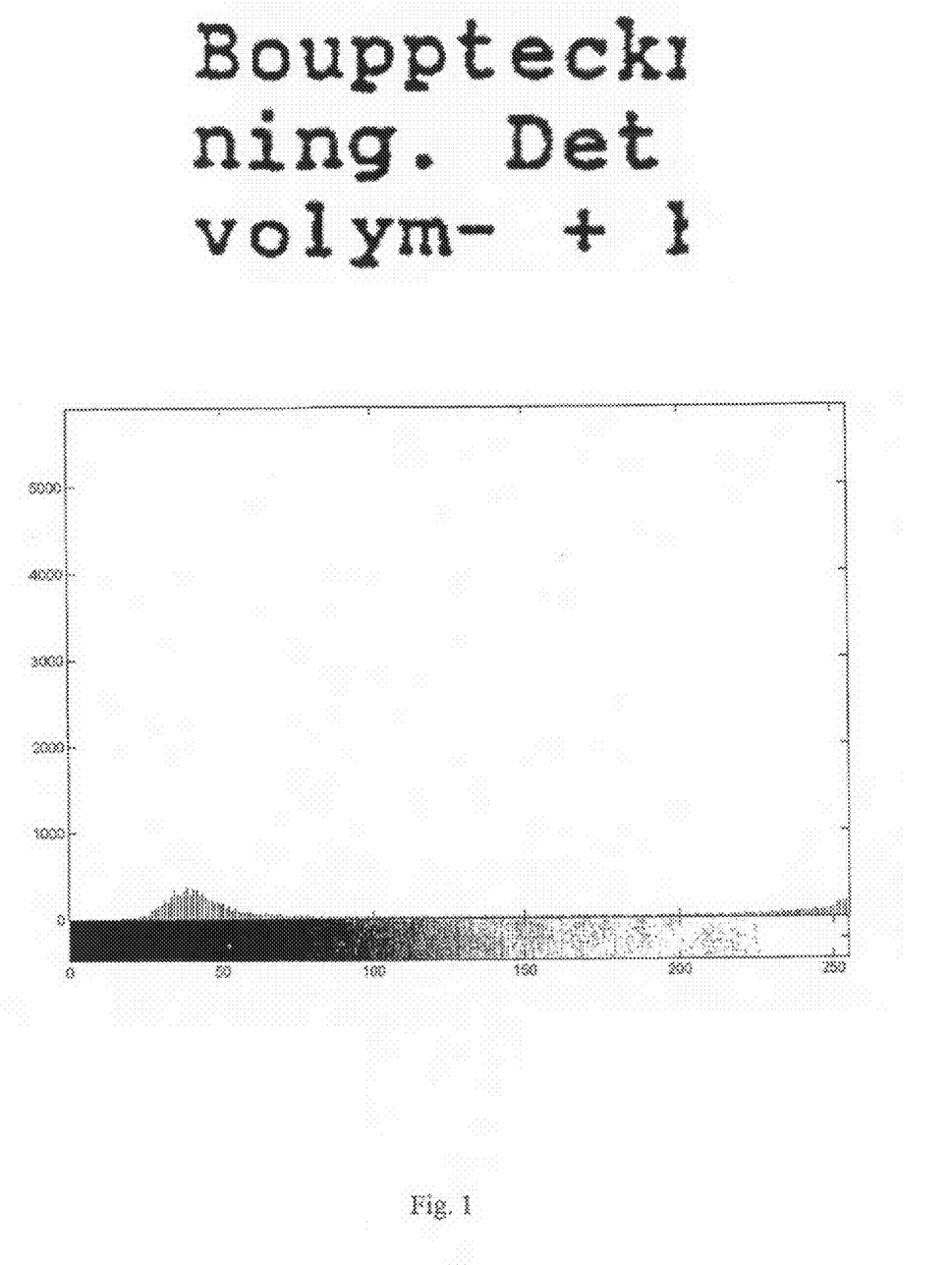
FIG. 1 depicts an example of easily separated background and foreground elements in an image of text.

FIG. 1 illustrates an example of easily separated foreground and background elements in an image of text. The image is a priori divided into, for example 256 (8 bits) different grey levels starting with zero defined as completely black while 255 is defined as completely white. The image is analyzed, and the number of pixels comprising the different grey levels is accumulated in a histogram as depicted below the text examples in FIGS. 1, 2, 3, 4 and 5. As can be seen from the histogram in FIG. 1, this image of a text comprise two distinguishable peaks of counts which indicate that there is a distinct foreground level (mainly black characters of grey level 40), and a distinct white background level of about 250. Therefore, threshold levels identified from this histogram would provide means for identifying foreground and background in the image at a very high confidence level, as known to a person skilled in the art. A threshold derived from the histogram may then be utilized to create a binary image of the image, as known to a person skilled in the art.

Figure 2:
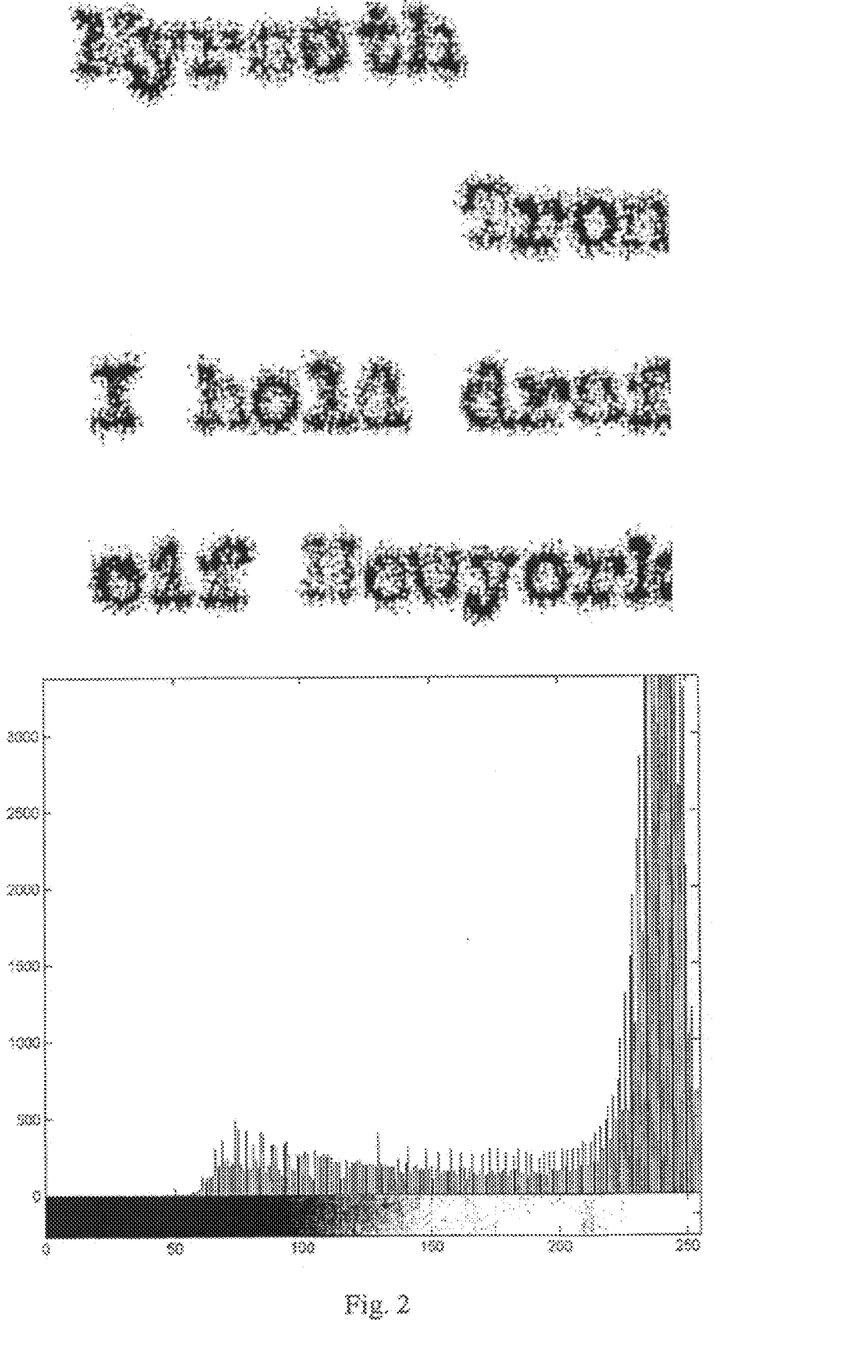
FIG. 2 depicts another example illustrating difficult separable background and foreground elements in an image of text.

However, FIG. 2 illustrates a different example of a text image wherein the histogram, despite comprising a distinct peak for the background, does not comprise a distinguishable peak for the foreground. This histogram does not provide a simple means for identifying a threshold for the foreground/background separation. The actual threshold could be anywhere between the histogram grey levels 50 and 200.

Figure 3:
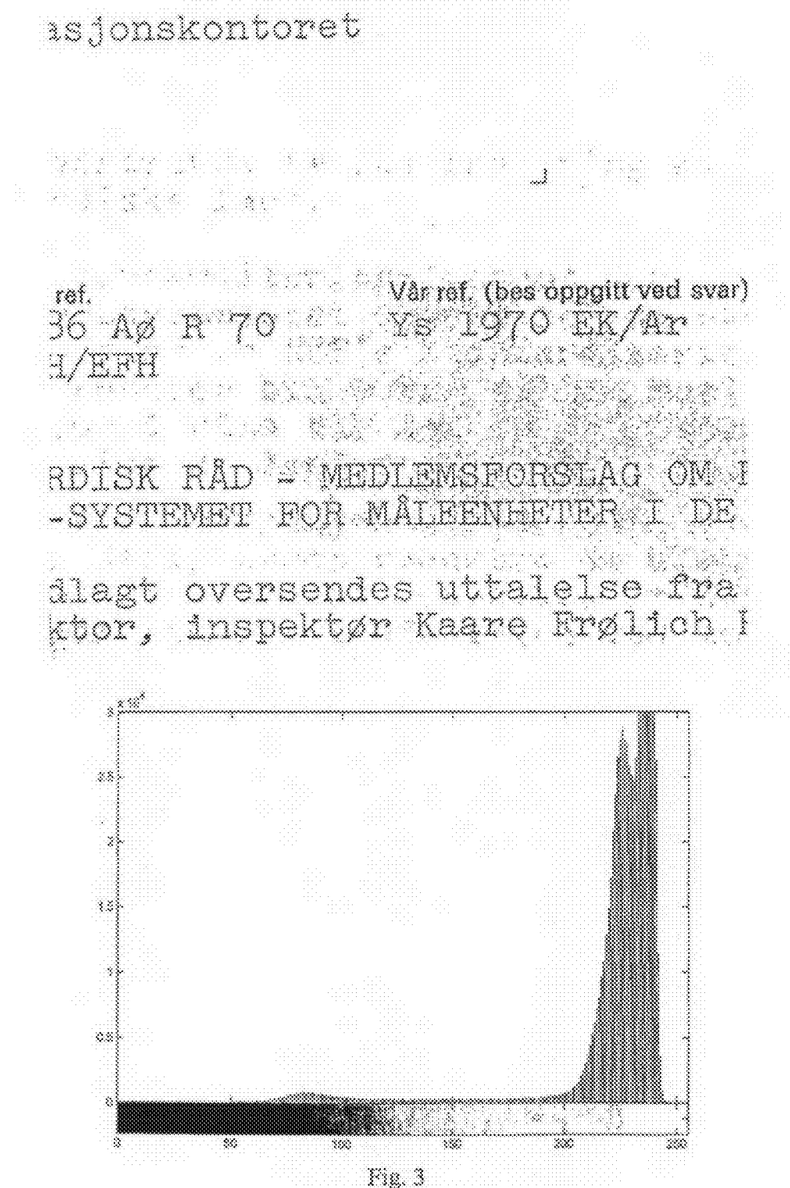
FIG. 3 depicts an example of a complex image background.

FIG. 3 illustrates another example of difficulties that may be encountered in image processing. The background comprises strike-through of letters from a previous page. The resulting histogram will therefore comprise three peaks.

Figure 4:
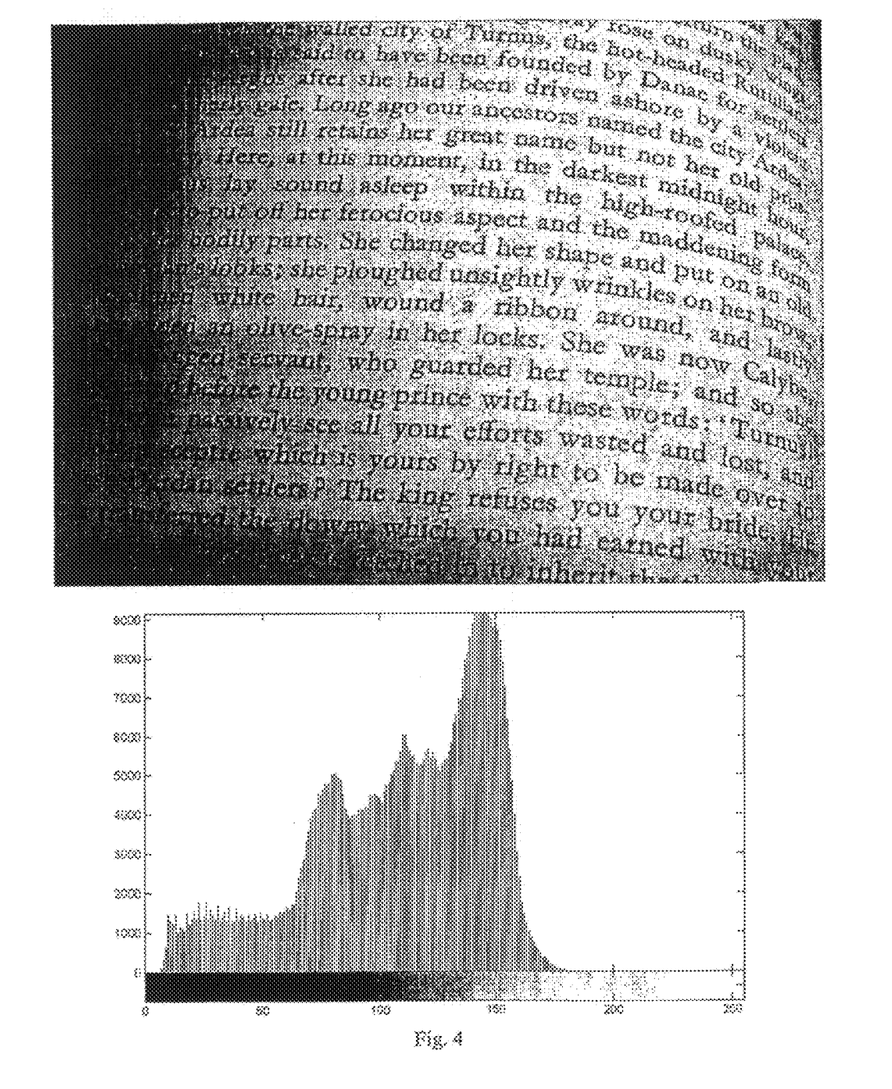
FIG. 4 depicts an example of slowly varying contrast in a text image.

FIG. 4 illustrates an example of image comprising a slowly varying background grey level. The resulting histogram indicates that there is no distinguishable foreground and background despite that any human easily do this distinction visually in this example.

Figure 5:
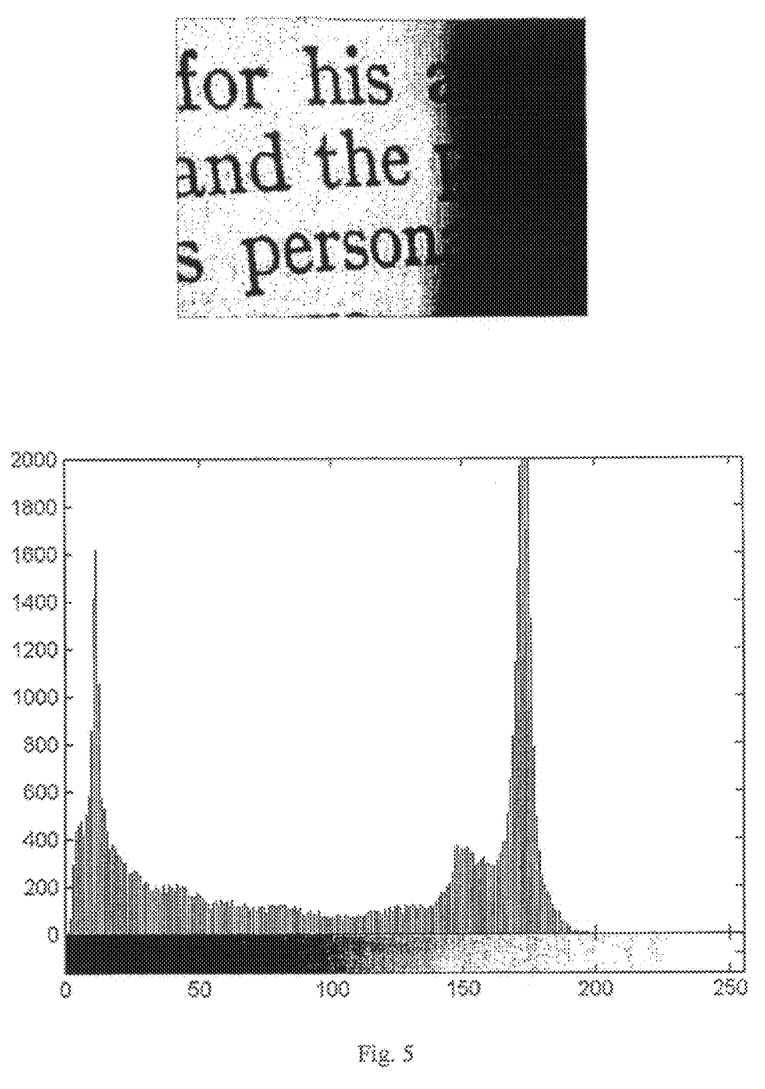
FIG. 5 depicts another example of a complex image background.

FIG. 5 illustrates another example of difficult separation of background and foreground levels. The resulting histogram comprises multiple peaks and therefore no single threshold.

The basic idea behind the present invention may be easily understood with reference to FIG. 4. The human eye has few problems distinguishing the illustrated text from the background despite the result of the histogram. The main advantage a human have above a prior art threshold technique, as in this example, is the human ability to easily identify the relative varying contrast between the text and the background. In a sense, the slowly varying contrast affects both the foreground and background, and may be regarded as being equal in level of distortion of both foreground and background within certain limits. Therefore, any relative magnitude in contrast (difference between foreground grey level and background grey level, for example) between the background and the foreground at a certain location in an image would almost certainly be equal in magnitude with the relative contrast at any other location in the image. The effect of subtracting or providing a relative measure of background/foreground is to eliminate the variations in the absolute background grey level and absolute foreground grey level.

An example of a method according to the present invention comprise steps for deriving local estimates of background, selecting sub-images where text is assumed to be present, deriving grey levels in estimated edges comprised in one selected of the sub-images assumed to comprise text, extracting local thresholds from the grey levels of the identified edges, derive a local relative threshold, using the relative threshold in the whole image when creating the binary image of the image. Details of steps of methods according to the present invention are described below in greater detail.

As indicated above with reference to FIG. 4, the relative contrast between the backgrounds an foreground is almost fixed. For example, in digital images the contrast may vary due to different illumination of different areas of the image. Since the variation in illumination affects the foreground and background almost equally, a relative measure (difference) will eliminate the underlying variation in grey levels provided by the varying illumination.

An aspect of the present invention is that the relative contrast may be postulated to be constant regardless of the causes of variations in grey levels of the background and foreground in the image.

Therefore, once a local threshold is found, for example in a sub-image, and an estimate for background is established, the relative threshold for the whole image for producing an improved binary image of the image for OCR processing is identified. A threshold to be used may be proportional to the difference between the estimated background level and the local threshold level identified for the edges in the sub-image.

In an example of embodiment of the present invention, the proportionality constant is 1.

In another example of embodiment of the present invention, the proportionality constant is ½ (with offset to ensure continuity through the established contrast point).

In another example of embodiment of the present invention, the proportionality constant is a variable, $\alpha$, which is multiplied with the identified relative threshold of the image to be converted to a binary image, wherein the constant $\alpha$ is selected to be between 1 and ½ with corresponding offsets In another example of embodiment of the present invention, the constant $\alpha$ is adaptively adjustable.

In another example of embodiment of the present invention, an image may be divided into numbered columns, c, and rows, r, and the threshold of a particular location may be identified by the ordered number pair (r,c). According to an example of embodiment of the present invention, the relative threshold used to create binary images is defined as:

$$\tau(r, c) = \beta(r, c)\varsigma \quad \wedge \quad \varsigma = \frac{\tau_{local}}{\beta_{local}}.$$

where τ is the threshold grey level, β is the background grey level, and ζ is the relative contrast, r and c are row and column, respectively:

According to yet another example of embodiment of the present invention, an alternative relative contrast ζ can be as:

$$\varsigma = \text{median}\left(\frac{\gamma(r, c)}{\beta(r, c)}\right),$$

where γ(r,c) are the grey levels of the edges, and r,c are rows and columns in the image wherein the edge threshold is measured.

According to yet another example of embodiment of the present invention, the relative threshold value is calculated from the mean value of all calculated local threshold values and background levels.

Figure 6:
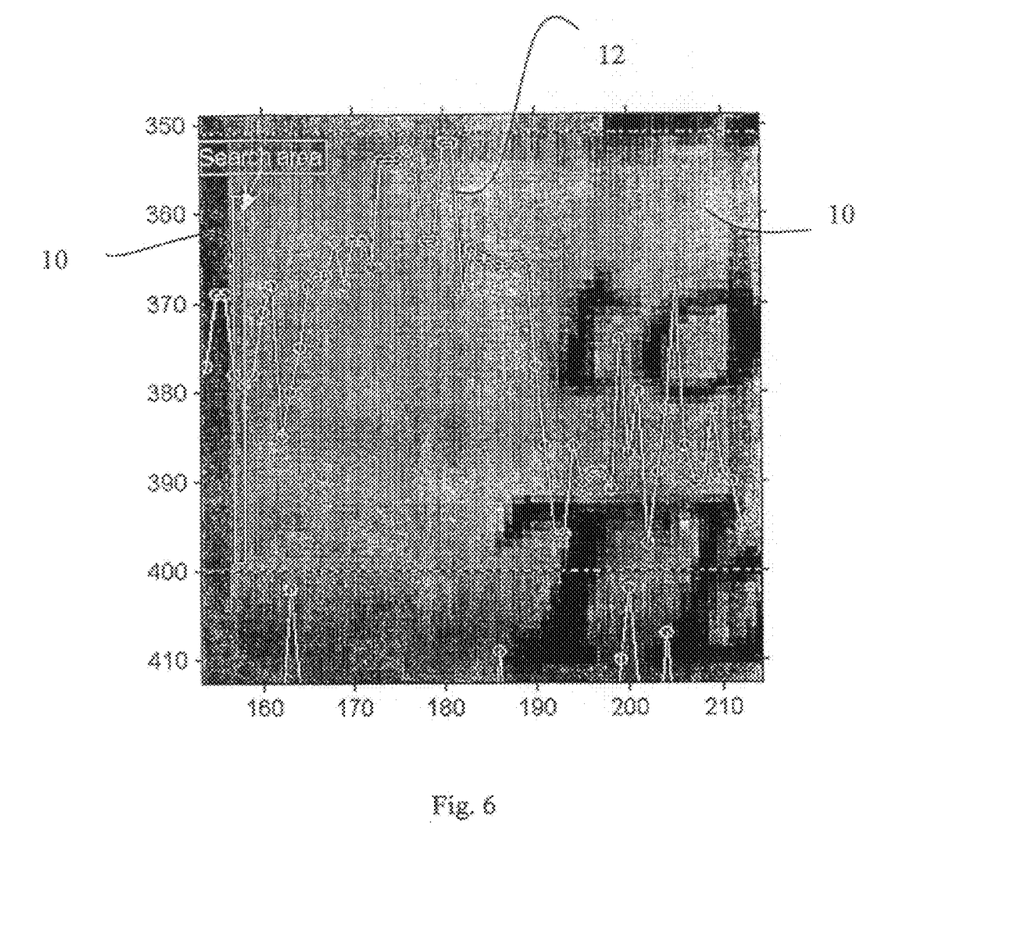
FIG. 6 illustrates an example of white path analysis according to the present invention.

According to an example of embodiment of the present invention, an estimate of the background in an image may be established by a so called white path analysis. A grey level code is defined, for example 8 bits grey level with zero as black while 255 represent the whitest pixel. FIG. 6 illustrates an example of white path analysis according to the present invention. An image is dived into horizontal stripes 10. A search area 11 is established, for example as illustrated between column 157 and 158 in the example in FIG. 6. The pixel with the maximum grey level in the search area is identified by the corresponding column and row number of the pixel. The next pixel is found in the next column, and so on. In FIG. 6, the identified whitest pixels are illustrated with a small circle, and the interconnecting graph between these points are called the whitest path 12, which may be used to provide an estimate of the background grey level β of the image.

However, if an object has a vertical dimension greater than the search window 11, the whitest path 12 might not be able to pass across the image without using some of the black pixels. This will constitute "noise" in the calculations, and therefore it can be necessary to filter the whitest path 12.

According to another example of embodiment of the present invention, a sliding window filtering technique may be used to do such filtering. For example, a sliding window median of a box, a median filter, as known to a person skilled in the art, may be used. A sliding average filter may also be used. However, it is important that the filter size of the mask is greater than the size of foreground details.

According to another aspect of the present invention, any filter or detection algorithm capable of providing an estimate of the background grey level may be used.

According to an example of embodiment of the present invention, an area with significant text coverage is identified, for example with standard character recognition techniques, which can identify areas with high number of identified characters. Any a priori knowledge of a document may also be used to identify text areas. An analysis of contrasts may also be used. An image may be divided into an arbitrary number of sub-images. The examination for identifying text areas may start with one of these sub-images. If the examination fails to report text in this sub-image, another next randomly positioned sub-image may be selected until one sub-image is found that comprise text.

Figure 7:
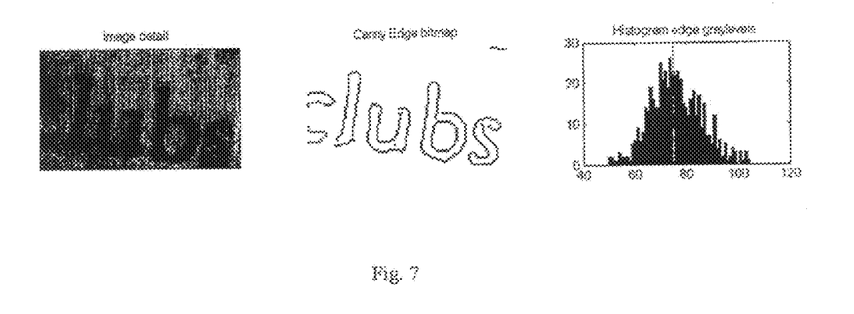
FIG. 7 illustrates an example of grey level edge threshold according to the present invention.

In such areas with text, a detection of edges, for example edges related to characters may be accomplished. One of the most effective edge detectors is the co called Canny edge detector, as known to a person skilled in the art. FIG. 7 illustrates an example of the result of using a Canny edge detector on a text image. The resulting edge detection results in an edge binary image.

According to another example of embodiment of the present invention, an image analysis that identifies text lines, as known to a person skilled in the art, is used to identify areas with text, and the text lines are searched in one of the two text line directions until a text line area is identified that actually comprise text. If no text area is identified, the search may continue in the other direction of the text. Edge detection may then be performed on edges in this identified area line, or the search continues on a next text line until an area comprising text is identified.

Figure 8:
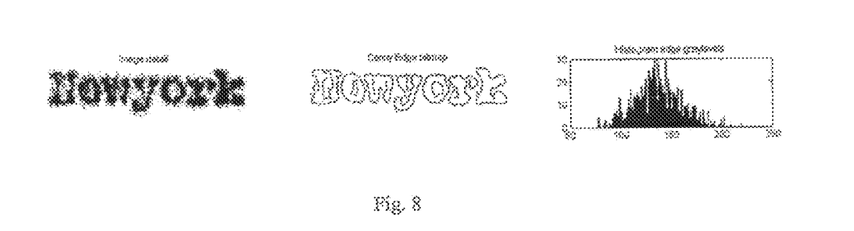
FIG. 8 illustrates another example of grey level edge threshold according to the present invention.
Figure 9:
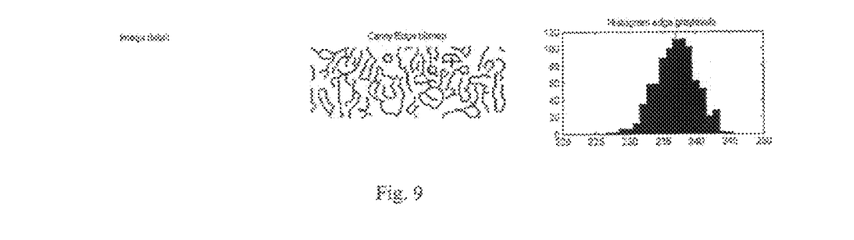
FIG. 9 illustrates another example of grey level edge threshold according to the present invention.

According to an aspect of the present invention, based on the location of the edges in the binary image, it is possible to generate a histogram of grey levels of the corresponding edges in the image, as illustrated in FIG. 7. By selecting the top position, mean or median position etc. in the histogram, a grey level threshold for the edges is established. Further examples of edge detection and corresponding grey level thresholds for edges are illustrated in FIGS. 8 and 9. These examples illustrates that even when the edges are not clearly identifiable by a human eye, the corresponding histograms provide an identifiable peak that provides a working grey level threshold.

According to another example of embodiment of the present invention, in addition to the Canny detector, a different additional edge detector is used to verify the results of the Canny detector. Whenever there is a miss match between the results, those pixel locations are not used in the histogram process of the edges.

Based on the white path analysis, and/or sliding window filtering, a background level estimate $\beta_{local}$, and a local grey level $\tau_{local}$ base on grey level histogram of edges in the image provides a measure for a grey level threshold $\tau = \beta(r,c)\varsigma$ as outlined above.

According to an aspect of the present invention, any method for background estimate and edge detection may be used, and is considered to be within the scope of the present invention.

According to yet another example of embodiment of the present invention, a program module executing steps of a method as outlined above, comprise steps that:

Locates text in at least a part of the image by document analysis.

Verifies the document analysis by character recognition.

Use the size of the identified text to establish a window size for the background analysis.

Provides an estimate of the background, either by white path analysis and/or median background methods.

Find the relative contrast in text areas by identifying edges in the image, and then create a grey level histogram of the detected edges.

Calculate the relative threshold levels throughout the image.

Convert the image from grey level to binary image representation, by using the local relative threshold for each section of the image that is to be converted.

According to an example of embodiment of the present invention, when the text comprise large text elements such as headlines, the text is decimated before the steps as outlined above is repeated.

According to yet another example of embodiment of the present invention, an analysis of the background is performed, and whenever there is a rapid change or rapid variations in the background level, a smaller window size is used in the transitions areas comprising the rapid change or variations of the background level.

According to yet another example of embodiment of the present invention, an analysis of the text structure in the converted binary image of the text image is performed for revealing missing parts of lines, black areas between lines of text, etc. that indicates that there is areas that should be analysed again with a different local relative threshold to reveal text elements in the missing parts of the document.

According to an example of embodiment of the present invention, a computer readable medium comprising computer instructions executing a program module comprising the steps of a method according to the present invention can be loaded by a computer system such that an Optical Character Recognition system may utilize the benefits of the present invention. The computer readable medium may be a network or other known distribution means of software as known to a person skilled in the art.

Figure 10:
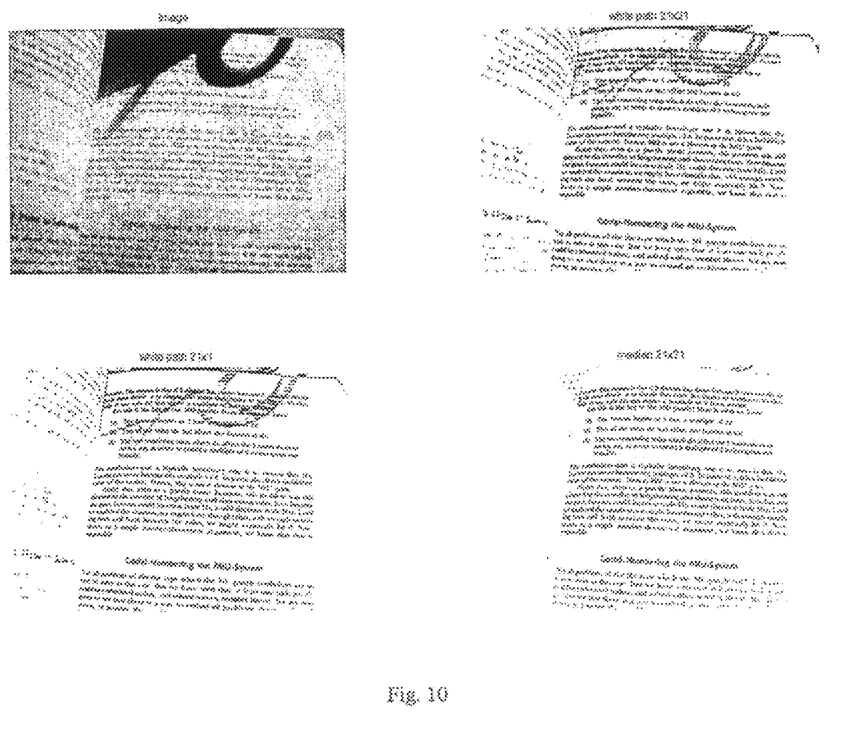
FIGS. 10 and 11 illustrates resulting binary images generated according to an example of embodiment of the present invention.
Figure 11:
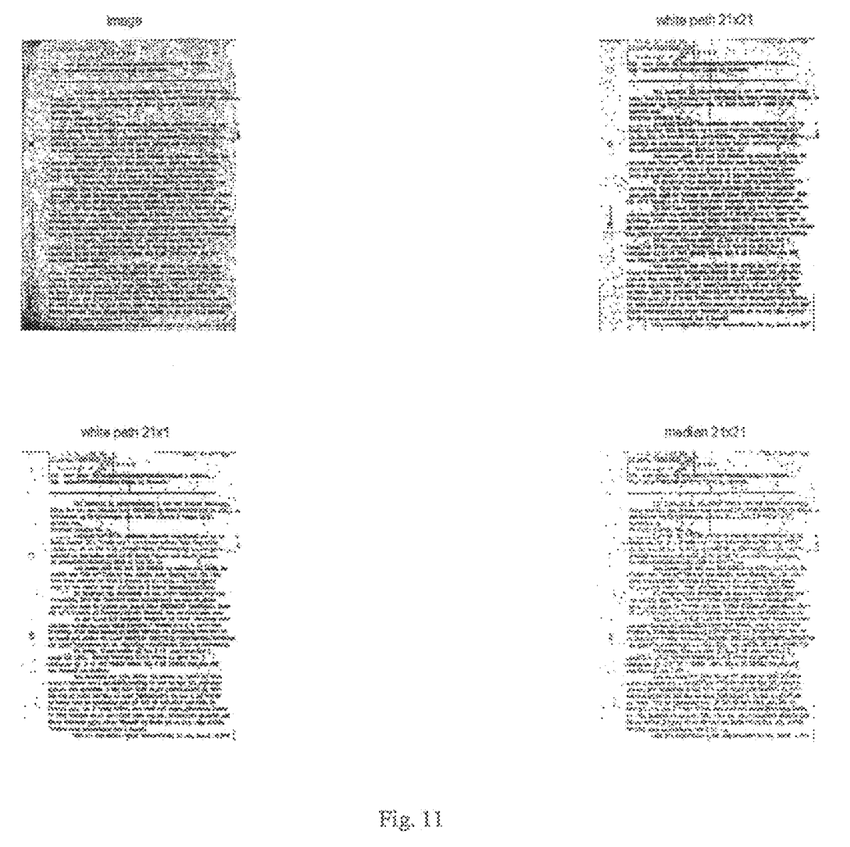

FIGS. 10 and 11 illustrates examples of resulting conversions to binary images of images by the example of embodiment outlined above. FIG. 10 depicts an image of a book page comprising a shadow from a coffee cup. FIG. 10b is the result when using a white path technique with a 21×1 pixel search area (see FIG. 6). FIG. 10c illustrates the resulting binary image when using a sliding median filtering with a sliding window size of 21×21 pixels. FIG. 11 illustrates similar examples of resulting binary image conversions.

According to yet another example of embodiment of the present invention, the notion that the relative contrast is almost constant throughout an image, and therefore a same relative grey level threshold may be applied throughout the whole image, may be modified to comprise a notion that the relative threshold may be used as a constant value in sub-images of the image. Restricted areas may exhibit features that make the relative threshold vary between sub-images or different areas of the image. To be able to cope with such situations, an example of embodiment of the present invention comprise the steps of dividing an image into sub-images, wherein a relative threshold is identified within each sub-image, respectively, as outlined above, and is converted correspondingly to a binary image representation sub-image by sub-image, respectively. According to yet another example of embodiment of the present invention, the step of dividing the image in sub-images is accomplished by following identified text lines, one by one, respectively, such that each text line is treated as a sub-image.

According to another example of embodiment of the present invention, the relative to threshold is calculated for at least two locations along a text line, thereby revealing if there is a possible flaw with the notion that the relative contrast is constant. If the relative contrast do varies along the text line, the text line is divided into more subsections, respectively, wherein each part of the text line is calculated and converted individually, respectively. According to this example of embodiment of the present invention, the method for estimating the background grey level may be used as described above.

According to an aspect of the present invention, non-linear effects related to the contrast of the image may be taken into account in all directions of the image. According to the example of embodiment of the present invention utilizing text lines as sub-images, the text line detection may be performed on all lines in the image, and by searching, verifying and converting the image text line by text line, respectively, and by examining each text line for homogenous contrast conditions, the whole image will be examined and assigned multiple relative threshold levels that are representative for all sub-images of text in the document. If inhomogeneous contrast is detected along the text line, a division of the text line is performed, comprising at least two sub-images of the text line. If there is identified a more varying contrast along the text line, multiple sub-images are created out of the text line.

According to an example of embodiment of the present invention, an Optical Character Recognition system comprise a module that separate all colours identified in an image of text into a set of images of the text wherein each image comprise one of the colours, respectively. Each of the images representing each of the colours is then used in the method according to the present invention as a sub-image for identifying the relative threshold. When the method according to this example fails to identify a text area on one of the image levels, a next one of the image levels are used until a text area is identified. If the relative contrast varies too much on this image level, a further partitioning of this image level is performed, and each sub-part is treated according to the present invention, as readily can be understood by a person skilled in the art. If the background is darker than the foreground, the image may be inverted.

The invention claimed is:

1. A method for converting an image of text comprising background and foreground graphical representations of elements to a binary image representation of the image in a computer system, by using a threshold technique, the method comprises the steps of:
   a) providing an analysis of the background by identifying grey levels of pixels, in sections of the image, and record positions of grey levels with a highest level representing a colour white within each respective section,
   b) using the recorded positions of white pixels from step a) to estimate a local background level of the image in each respective section,
   c) selecting a sub-image part of the image and investigate if there are text elements in the sub-image part,
   d) if no text element is identified in c), select another next sub-image part and investigate if there is a text element in this next sub-image part,
   e) repeat step c) and d) until a text element is identified,
   f) use an edge detector on the sub-image comprising the identified text element, thereby identifying positions of pixels in the edge around the element,
   g) use the identified pixel positions of the edges to generate a histogram of grey levels representing the edges,
   h) use the histogram of the grey levels of the edges from step g) to derive a local threshold level, wherein the local threshold identifies the local foreground level of the grey levels of pixels, and use the position of the identified pixels in the edges to find a corresponding section around these pixels that was used in step a) and use the estimated local background of this corresponding section from step b) to provide a relative threshold level of the image as being proportional to the difference between the local threshold level and the estimated background level,
   i) use the relative threshold level from step h) as a contrast measure of the image and use this contrast measure to convert the image to a binary image representation of the image.

2. The method according to claim 1, further comprises:
   partitioning the image into rows r, and columns c, the partitioning is to be used in step a) and step b), the contrast measure is calculated to be:

$$\tau(r, c) = \beta(r, c)\varsigma, \quad \text{where } \varsigma = \frac{\tau_{local}}{\beta_{local}},$$

wherein τ is the foreground level, β is the background level, and ζ is the contrast measure, r and c are rows and columns, respectively.

3. The method according to claim 2, wherein the contrast measure ζ is defined as:

$$\varsigma = \text{median}\left(\frac{\gamma(r, c)}{\beta(r, c)}\right),$$

where γ (r,c) are the grey levels of the edges.

4. The method according to claim 1, wherein the contrast measure is multiplied with a constant α adjustably set to a value within an interval ½≦α≦1, thereby providing an offset of the contrast measure to keep a proper relative value of the contrast measure through the measured threshold levels defining the contrast measure.

5. The method according to claim 1, wherein the step c) comprise detection of text lines in the image, and wherein the text lines are used as the sub-image parts, and wherein the investigation of the sub-image part to establish if there is a text element in the sub-image part starts by searching the text line in one of the two text line directions, and if no text element is identified along this text line direction, a next text line is used for the investigation as a next sub-image part in step d) and e).

6. The method according to claim 5, when a search in one of the two text line directions fails to identify a text area, the search is reversed and performed in the opposite direction.

7. The method according to claim 1, wherein an analysis further is performed to estimate a level of variation of the contrast measure in a plurality of sub-image parts in the image, and if the level of variation of the contrast measure exceeds a predefined level, the steps a), b), c), d), e), f), g), h), i) is performed on each of the plurality of sub-image parts, respectively.

8. The method according to claim 1, wherein step a) comprises using a sliding window filter.

9. The method according to claim 8, wherein the sliding window filter is activated if the levels of the recorded white pixels comprise an abrupt change in the white pixel levels.

10. The method according to claim 8, wherein the sliding window filter is a sliding average filter.

11. The method according to claim 8, wherein the sliding window filter is a sliding median filter.

12. The method according to claim 8, wherein the window size of the sliding window filter is adjusted according to the size of foreground graphical elements in the image.

13. The method according to claim 1, wherein step f) comprises using a Canny edge detector.

14. The method according to claim 13, wherein step f) comprises using the Canny edge detector together with a different additional edge detector to verify the results of the Canny detector.

15. An Optical Character Recognition system, comprising a module that identifies all colour pixel levels used in an image of text, and that separates the different colour pixel levels into corresponding images for each identified colour level, respectively, and wherein the module utilize the method according to claim 1 on each of the respective images of the colour levels as the sub-images of step c).

16. A computer program on a non-transitory computer readable medium comprising instructions that when loaded into a computer system, executes a method according to claim 1 such that an Optical Character Recognition system in the computer may benefit from the method.

17. The method according to claim 1, wherein step a) further comprise inverting the image if the background is darker than the foreground.

18. The Optical Character Recognition system according to claim 15, further comprising inverting the image if the background is darker than the foreground.

19. The non-transitory computer readable medium according to claim 16, further comprising instructions that, when loaded into a computer system, is inverting the image if the background is darker than the foreground.

\* \* \* \* \*